(12) United States Patent
Du et al.

(10) Patent No.: US 11,904,941 B1
(45) Date of Patent: Feb. 20, 2024

(54) ADJUSTABLE FRONT AXLE AND A VEHICLE HAVING SAME

(71) Applicant: SHANGHAI LINGHUO TRADING CO., LTD., Shanghai (CN)

(72) Inventors: Dehui Du, Shanghai (CN); Jia Fu, Shanghai (CN); Bin Cheng, Shanghai (CN)

(73) Assignee: SHANGHAI LINGHUO TRADING CO., LTD., Shanghai (CN)

( * ) Notice: Subject to any disclaimer, the term of this patent is extended or adjusted under 35 U.S.C. 154(b) by 0 days.

(21) Appl. No.: 18/122,686

(22) Filed: Mar. 16, 2023

Related U.S. Application Data

(63) Continuation of application No. 18/099,222, filed on Jan. 19, 2023, now Pat. No. 11,745,797.

(30) Foreign Application Priority Data

| | | |
|---|---|---|
| Dec. 2, 2022 | (CN) | 202223241482.9 |
| Dec. 2, 2022 | (CN) | 202223241559.2 |
| Dec. 2, 2022 | (CN) | 202223243012.6 |
| Dec. 2, 2022 | (CN) | 202223243015.X |

(51) Int. Cl.
*B60B 35/14* (2006.01)
*B62D 17/00* (2006.01)
*B60B 35/00* (2006.01)

(52) U.S. Cl.
CPC ............ *B62D 17/00* (2013.01); *B60B 35/004* (2013.01); *B60B 35/14* (2013.01); *B60B 2900/541* (2013.01)

(58) Field of Classification Search
CPC ........ B62D 17/00; B60B 35/004; B60B 35/14
See application file for complete search history.

(56) References Cited

U.S. PATENT DOCUMENTS

| | | |
|---|---|---|
| 2,464,744 A | 3/1949 | Fennema |
| 2,986,908 A | 6/1961 | Wilkerson |
| 3,100,660 A | 8/1963 | Kempf |
| 4,191,487 A | 3/1980 | Schultenkamper |
| 4,252,338 A * | 2/1981 | Ingalls .................. B62D 17/00 |
| | | 280/86.756 |

(Continued)

FOREIGN PATENT DOCUMENTS

| | | | |
|---|---|---|---|
| CN | 113186384 | * | 7/2021 |
| CN | 113335378 A | | 9/2021 |

(Continued)

*Primary Examiner* — Scott A Browne
(74) *Attorney, Agent, or Firm* — Cheng-Ju Chiang

(57) ABSTRACT

An adjustable front axle includes an axle housing; an axle tube connected to an end of the axle housing; an inner-C-forging disposed on the axle tube at an end away from the axle housing; and a mounting apparatus configured for detachably fixing the inner-C-forging to the axle tube. The inner-C-forging is provided with a first angle adjustment structure, the axle tube is provided with a second angle adjustment structure. The mounting apparatus is disposed on the axle tube, and capable of cooperating with the inner-C-forging to fix the inner-C-forging to the axle tube. The first angle adjustment structure and the second angle adjustment structure have different cooperation positions such that the inner-C-forging has different installation angles relative to the axle tube. A vehicle is also provided.

19 Claims, 14 Drawing Sheets

(56) References Cited

U.S. PATENT DOCUMENTS

| | | | |
|---|---|---|---|
| 4,867,472 A | | 9/1989 | Ward |
| 4,953,889 A | * | 9/1990 | Reilly .................... B62D 17/00 |
| | | | 280/86.756 |
| 5,060,750 A | * | 10/1991 | Klages ................. B60K 17/306 |
| | | | 180/385 |
| 5,628,578 A | | 5/1997 | McClanahan et al. |
| 6,082,190 A | * | 7/2000 | Breidenbach ............ G01C 9/00 |
| | | | 33/570 |
| 6,729,633 B1 | * | 5/2004 | Irwin ..................... B62D 17/00 |
| | | | 280/86.75 |
| 7,029,398 B1 | * | 4/2006 | Burnard .................. F16D 3/387 |
| | | | 403/14 |
| 7,862,059 B2 | * | 1/2011 | Ko ....................... B60G 21/051 |
| | | | 280/124.13 |
| 10,202,014 B2 | * | 2/2019 | Womack ............... B60B 35/004 |
| 11,203,231 B1 | * | 12/2021 | Du ........................ F16B 7/0406 |
| 11,214,094 B1 | * | 1/2022 | Du .......................... F16B 7/182 |
| 11,300,162 B2 | * | 4/2022 | Corpus ................... F16D 1/116 |
| 2004/0023570 A1 | | 2/2004 | Bridge et al. |
| 2006/0260116 A1 | * | 11/2006 | Bormuth ................ B21K 25/00 |
| | | | 29/521 |
| 2014/0356062 A1 | | 12/2014 | Janvier et al. |

FOREIGN PATENT DOCUMENTS

| | | |
|---|---|---|
| CN | 214775200 U | 11/2021 |
| CN | 217197639 U | 8/2022 |
| CN | 217197641 U | 8/2022 |
| KR | 10-1342666 B1 | 12/2013 |

* cited by examiner

ADJUSTABLE FRONT AXLE AND A VEHICLE HAVING SAME

CROSS REFERENCE TO RELATED APPLICATION

The present patent document is a continuation application of U.S. application Ser. No. 18/099,222, filed on Jan. 19, 2023, which claims the benefit of priority of Chinese patent application number 202223241482.9, filed on Dec. 2, 2022, and entitled "AN ADJUSTABLE FRONT AXLE FIXED BY THREADS AND A VEHICLE HAVING THE SAME", the benefit of priority of Chinese patent application number 202223243015.X, filed on Dec. 2, 2022, and entitled "AN ADJUSTABLE FRONT AXLE FIXED BY A BASE AND A VEHICLE HAVING THE SAME", the benefit of priority of Chinese patent application number 202223241559.2, filed on Dec. 2, 2022, and entitled "A DRIVE FRONT AXLE FIXED BY CIRCUMFERENTIAL COMBINATION AND A VEHICLE HAVING THE SAME", and the benefit of priority of Chinese patent application number 202223243012.6, filed on Dec. 2, 2022, and entitled "DRIVE FRONT AXLE FIXED BY END FACE COMBINATION AND A VEHICLE HAVING THE SAME". The entire disclosure of the above-identified application is incorporated herein by reference.

TECHNICAL FIELD

The present document relates to automobile structures, in particular to an adjustable front axle and a vehicle having the same.

BACKGROUND

Since the launch of the first off-road vehicle model, the appearance, interior trim, four-wheel drive technology, and power system of the off-road vehicle have made great progress, however, as the core of the chassis, the front axle assembly has not been substantially improved.

SUMMARY

The present document discloses, among other things, an adjustable front axle and a vehicle having the same. The adjustable front axle can conveniently adjust the caster angle and the pinion to driveshaft angle independently while ensuring the support strength.

The adjustable front axle includes an axle housing; an axle tube connected to an end of the axle housing; an inner-C-forging disposed on the axle tube at an end away from the axle housing; and a mounting apparatus configured for detachably fixing the inner-C-forging to the axle tube. The inner-C-forging is provided with a first angle adjustment structure, the axle tube is provided with a second angle adjustment structure, the mounting apparatus is disposed on the axle tube, and capable of cooperating with the inner-C-forging to fix the inner-C-forging to the axle tube. The first angle adjustment structure and the second angle adjustment structure have different cooperation positions such that the inner-C-forging has different installation angles relative to the axle tube.

In some embodiments, the mounting apparatus is sleeved around the axle tube and capable of being screwed to the inner-C-forging.

In some embodiments, the inner-C-forging includes a first annular ring, the mounting apparatus includes a second annular ring, one of the first annular ring and the second annular ring is provided with external threads, the other one of the first annular ring and the second annular ring is provided with internal threads, the mounting apparatus and the inner-C-forging are connected by the internal threads and the external threads.

In some embodiments, the axle tube includes a flange at an end away from the axle housing, the mounting apparatus includes a base which is disposed around the axle tube and a plurality of connecting members which is capable of extending through the base and the flange, and uniting with the inner-C-forging to fix the inner-C-forging to the axle tube.

In some embodiments, the axle tube includes a flange at an end away from the axle housing, if the inner-C-forging is fixed to the axle tube, the flange is sandwiched between the inner-C-forging and the mounting apparatus.

In some embodiments, the first angle adjustment structure is provided on an end surface of the inner-C-forging which faces to the axle tube, the second angle adjustment structure is provided on an end surface of the axle tube which faces to the inner-C-forging.

In some embodiments, the inner-C-forging includes a backing plate which is mounted to an inner side of the inner-C-forging and is perpendicular to an axis of the inner-C-forging, the first angle adjustment structure is formed on an end surface of the backing plate which faces to the flange.

In some embodiments, the inner-C-forging includes a reinforcement tube which is capable of extending into the axle tube, the axle tube includes a third annular ring inside the axle tube, the first angle adjustment structure is formed on an end surface of the reinforcement tube which faces to the third annular ring, the second angle adjustment structure is provided on an end surface of the third annular ring which faces to the reinforcement tube.

In some embodiments, the first angle adjustment structure is provided on a side surface of the inner-C-forging which is parallel to an axis of the inner-C-forging, the second angle adjustment structure is provided on a side surface of the axle tube which is parallel to an axis of the axle tube.

In some embodiments, inner-C-forging includes a reinforcement tube which is capable of extending into the axle tube, the first angle adjustment structure is provided on an outer side surface of the reinforcement tube, the second angle adjustment structure is provided on an inner side surface of the axle tube.

In some embodiments, the inner-C-forging includes a first annular ring which is capable of receiving the flange, the first angle adjustment structure is provided on an inner side surface of the first annular ring, the second angle adjustment structure is provided on an outer side surface of the flange.

In some embodiments, one of the first angle adjustment structure and the second angle adjustment structure is provided with a plurality of protrusions, the other one of the first angle adjustment structure and the second angle adjustment structure is provided with a plurality of depressions, the protrusions or the depressions are disposed along a circumferential direction of a corresponding axle tube or a circumferential direction of the inner-C-forging, the second angle adjustment structure has different cooperation positions on the first angle adjustment structure by means of the cooperation of the protrusions and different depressions.

The present document also discloses a vehicle, which includes an adjustable front axle. The adjustable front axle includes: an axle housing; an axle tube connected to an end of the axle housing; an inner-C-forging disposed on the axle tube at an end away from the axle housing and configured for connecting with a kingpin knuckle; a mounting apparatus configured for detachably fixing the inner-C-forging to the axle tube. The inner-C-forging is provided with a first angle adjustment structure which includes a plurality of protrusions or a plurality of depressions, the axle tube is provided with a second angle adjustment structure which includes a plurality of depressions or a plurality of protrusions. The mounting apparatus is disposed on the axle tube, and capable of cooperating with the inner-C-forging to fix the inner-C-forging to the axle tube. The first angle adjustment structure and the second angle adjustment structure have different cooperation positions such that the inner-C-forging has different installation angles relative to the axle tube, and a caster to pinion angle is different at inner-C-forging's different installation angles.

In some embodiments, the axle tube includes a flange at an end away from the axle housing, the inner-C-forging includes a first annular ring which is capable of receiving the flange, the mounting apparatus includes a base which is disposed between the flange and the axle housing, and a second annular ring which axially extends from the base. One of the first annular ring and the second annular ring is provided with external threads, the other one of the first annular ring and the second annular ring is provided with internal threads, the mounting apparatus and the inner-C-forging are connected by the internal threads and the external threads.

In some embodiments, the axle tube includes a flange at an end away from the axle housing, the mounting apparatus includes a base which is disposed around the axle tube and a plurality of connecting members which is capable of extending through the base and the flange, and uniting with the inner-C-forging to fix the inner-C-forging to the axle tube.

In some embodiments, the first angle adjustment structure is provided on an end surface of the inner-C-forging which faces to the axle tube, the second angle adjustment structure is provided on an end surface of the axle tube which faces to the inner-C-forging, or the first angle adjustment structure is provided on a side surface of the inner-C-forging which is parallel to an axis of the inner-C-forging, the second angle adjustment structure is provided on a side surface of the axle tube which is parallel to an axis of the axle tube.

In some embodiments, the axle tube includes a flange at an end away from the axle housing, the inner-C-forging includes a backing plate perpendicular to an axis of the inner-C-forgoing, the first angle adjustment structure is provided on an end surface of the backing plate which faces to the flange, the second angle adjustment structure is provided on an end surface of the flange which faces to the backing plate, if the inner-C-forging is fixed to the axle tube, the flange is sandwiched between the inner-C-forging and the mounting apparatus, with the first angle adjustment structure engaging with the second angle adjustment structure.

In some embodiments, the inner-C-forging includes a reinforcement tube which is capable of extending into the axle tube, the axle tube includes a third annular ring inside the axle tube, the first angle adjustment structure is formed on an end surface of the reinforcement tube which faces to the third annular ring, the second angle adjustment structure is provided on an end surface of the third annular ring which faces to the reinforcement tube.

In some embodiments, the axle tube includes a flange at an end away from the axle housing, the inner-C-forging includes a first annular ring which is capable of receiving the flange, the first angle adjustment structure is provided on an inner side surface of the first annular ring, the second angle adjustment structure is provided on an outer side surface of the flange.

In some embodiments, the inner-C-forging includes a reinforcement tube which is capable of extending into the axle tube, the first angle adjustment structure is provided on an outer side surface of the reinforcement tube, the second angle adjustment structure is provided on an inner side surface of the axle tube.

In some embodiments, the inner-C-forging on at least one of the axle tube is separately arranged from the corresponding axle tube, and the inner-C-forging is detachably mounted to the axle tube through the mounting apparatus. When it is required to adjust the caster angle, the components on one side of the vehicle can be disassembled, and the inner-C-forging can be rotated around its own axis to a suitable angle and rejoined with the axle tube, such that the protrusions could engage with the corresponding depressions. Finally, the mounting apparatus is rejoined to the inner-C-forging to sandwich the flange between the inner-C-forging and the mounting apparatus and complete the assembly of the inner-C-forging and the axle tube. This can change the installation angle of the inner-C-forging relative to the axle tube, and makes the caster angle be adjustable. In other words, by means of the engagement between the first angle adjustment structure and the second angle adjustment structure, the inner-C-forging is capable of having different installation angles relative to the axle tube. By means of sandwiching the flange between the mounting apparatus and the inner-C-forging, the inner-C-forging is hardly disengaged from the axle tube. Under the premise of ensuring the support strength, the adjustable front axle can easily adjust the caster angle and the caster to kingpin angle on both sides of the vehicle independently. Meanwhile, the positions and angles of the installation points of the components on the axle tube are still kept as original, and variables that affect the chassis wheelbase, the directional accuracy, and the suspension height can not be introduced.

DETAILED DESCRIPTION OF PREFERRED EMBODIMENTS

Figure 1:
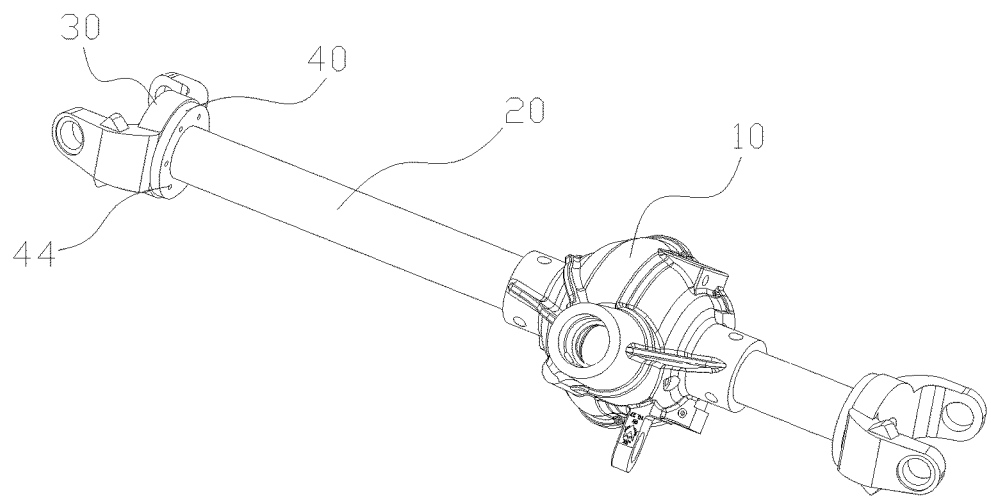
FIG. 1 is a schematic, isometric view of a first embodiment of an adjustable front axle.

In order to make the purpose, the technical solutions and the advantages of the present document, various embodiments will be further described in detail.

It should be noted that in the description, terms such as "first" and "second" are used to distinguish similar objects, and are not necessarily used to describe a specific order or sequence. It is to be understood that the data so used are interchangeable under appropriate circumstances such that the embodiments described herein can be practiced in sequences other than those illustrated or described herein.

In the present document, the orientation or positional relationship indicated by the terms "upper", "lower", "top", "bottom", etc. are based on the orientation or positional relationship shown in the drawings, and are only for the convenience of describing and for simplifying the description, rather than indicating or implying that the device or element must have a specific orientation, be constructed and operate in a specific orientation, and thus should not be construed as limitation of the embodiment. The X direction refers to the length direction of a vehicle, the Y direction refers to the width direction of the vehicle, and the Z direction refers to the height direction of the vehicle.

In addition, unless be clearly specified and limited, terms such as "install", "connect", "link" and "fix" in the present document should be interpreted in a broad sense. For example, the term may be used to describe a fixed connection or a detachable connection, or an integration into a single piece; directly connected, or indirectly connected through an intermediary, and may be an internal communication between two elements or an interaction relationship between two elements, unless otherwise clearly defined. For those of ordinary skill in the art the specific meanings of the above terms in the present document can be understood according to specific situations.

BRIEF INTRODUCTION

In the past 25 years, the global sales of off-road vehicles have exceeded 30 million, and consumers' demand for customization and modification of such models is also increasing day by day. For global automakers and modification shops, changing to bigger tires, replacing or enhancing the suspension system to lift the vehicle chassis for more ground clearance, and making the overall appearance of the vehicle more attractive have become the most common ways of customization in the industry. However, the lift of the vehicle chassis also brings the following technical limitations that obviously affect the vehicle handling experience, moreover, seriously threaten the safety of the people in the vehicle.

1. With the vehicle chassis lifted, the pinion to driveshaft angle has increased, causing the u-joint of the driveshaft to vibrate, thereby easily damaging the u-joints, seals, etc., and greatly increasing the probability of abnormal damage to the driveshaft and transfer case. At the same time, obvious chassis vibration is generated due to the distortion of these components during the running of the vehicle.

2. The lifted vehicle chassis also brings the drastic change in the installation position of the front axle assembly, which results in the caster angles on both sides of the front axle becoming smaller at the same time. Consequently, when the vehicle is driving in a straight line, the front wheels will vibrate, the steering wheel will swing indeterminately, and the steering will be touchy at high speed and wheel return-to-center will be diminished when coming out of a turn, which makes the driver lose the road feeling and have no confidence in the vehicle handling even when driving on conventional roads.

3. The increase in tire diameter, the wear of tires, the left-right imbalance of the suspension system, and the combination of other factors cause the vehicle fail to run straight and even sway to left and right. Although the problem of not being able to run straight can be fundamentally solved by independently and properly adjusting the caster angle on one side, however, both inner-C-forgings on all the current front axle assemblies have been welded to the axle tube as a factory setting, thus, the caster angle cannot be independently adjusted.

4. In order to alleviate the vehicle deviation symptoms, (simply put, not being able to run straight line) technicians often tend to adjust the wheelbase on one side by changing the length of the chassis control arms. However, not only this approach cannot fundamentally solve the problem of not being able to run straight, but also can make the vehicle produce distortion feeling when turning because the wheelbases on both sides are different from each other and no longer form a regular rectangle as the vehicle leaves the factory. In the course of running, the tires on both sides will do serpentine motion because of the wheelbases inconsistency, as a result, the direct feeling of driver is that the chassis is loose and unstable.

The fundamental reason why the above problems can not be solved is because of the common structural design of all the front axle assemblies in the current market: the caster angles and the pinion to driveshaft angle on both sides can not be independently adjusted, thus, consumers can only bear various vehicle handling problems and major potential safety hazards caused by this design. What global automakers and modification shops can do is to spend a lot of labor and time to continuously fine-tune the vehicles with underwhelming result, which leads to low customer satisfaction.

EMBODIMENTS

In one example aspect, the present document provides an adjustable front axle and a vehicle having the same. The adjustable front axle can conveniently adjust the caster angle and the pinion to driveshaft angle of the vehicle independently while ensuring the supporting strength.

First Embodiment

Referring to FIG. 1 to FIG. 5, a first embodiment of an adjustable front axle includes an axle housing 10, two axle tubes 20, two inner-C-forgings 30, and at least one mounting apparatus 40. The axle tubes 20 are disposed at two opposite sides of the axle housing 10 respectively. The inner-C-forging 30 is located at an end of the axle tube 20 which is away from the axle housing 10 and is used to connect with a kingpin knuckle (not shown). At least one inner-C-forging 30 is detachably fixed to a corresponding axle tube 20 by a corresponding mounting apparatus 40. In some embodiments, the inner-C-forging 30 at one side of the front axle is detachably fixed to the axle tube 20 by the mounting apparatus 40, and the inner-C-forging 30 at the other side of the front axle is integrally formed with or welded to the axle tube 20. Alternatively, in some embodiments, the axle tubes 20 at both sides of the front axle are connected to the inner-C-forgings 30 by two mounting apparatuses 40 respectively.

Figure 6:
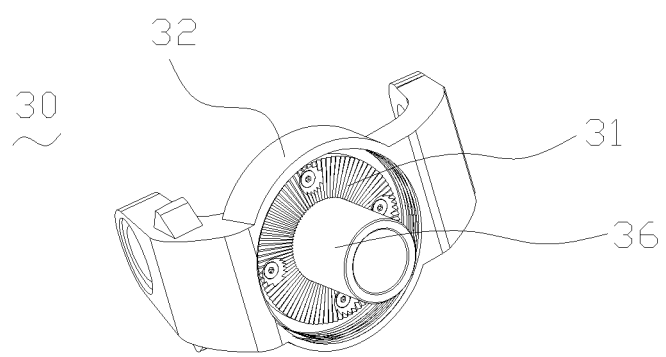
FIG. 6 is a schematic, isometric view of an inner-C-forging in FIG. 2.
Figure 7:
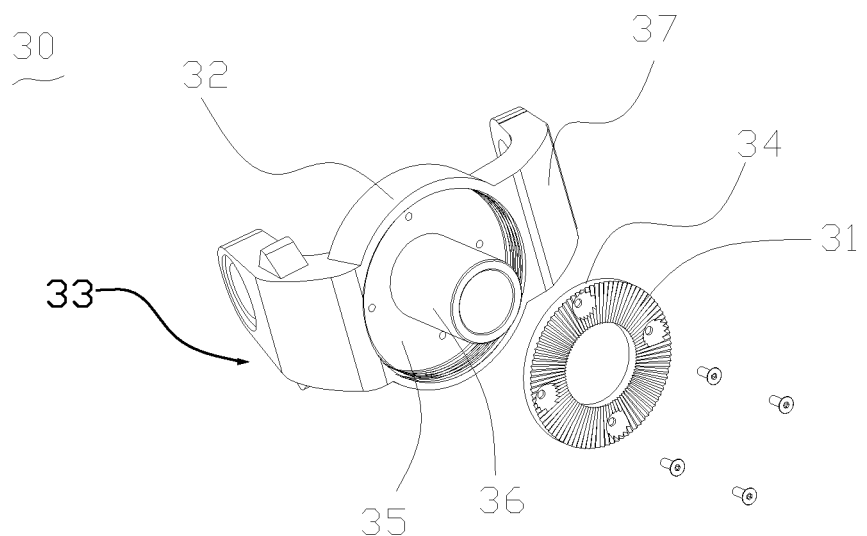
FIG. 7 is a schematic, exploded view of the inner-C-forging in FIG. 6.
Figure 8:
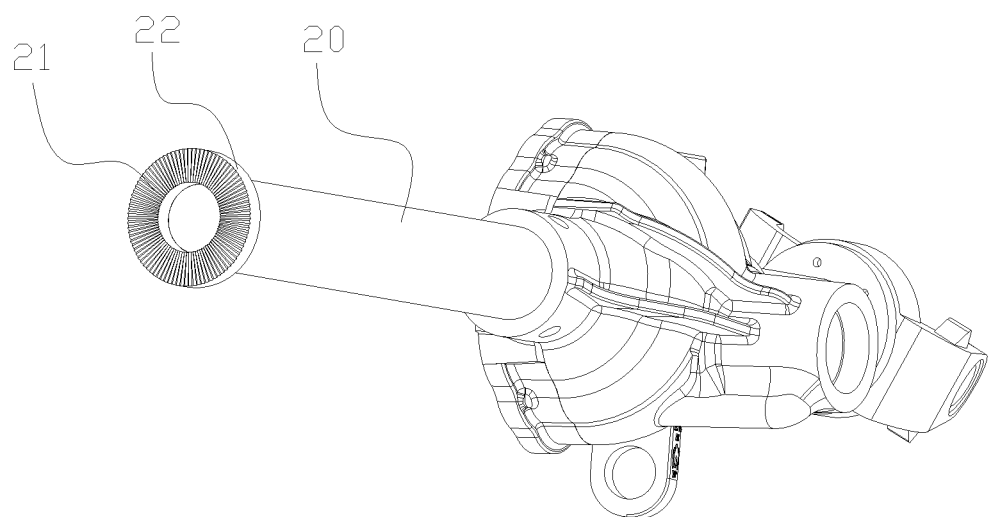
FIG. 8 is a schematic, isometric view of the adjustable front axle in FIG. 1 after removing the inner-C-forging and a mounting apparatus from one side thereof.

Referring to FIG. 6 through FIG. 8, the inner-C-forging 30 is provided with a first angle adjustment structure 31 on a surface facing to the axle tube 20, and the axle tube 20 is provided with a second angle adjustment structure 21 on a surface facing to the inner-C-forging 30. One of the first angle adjustment structure 31 and the second angle adjustment structure 21 is provided with a plurality of protrusions, and the other one of the first angle adjustment structure 31 and the second angle adjustment structure 21 is provided with a plurality of depressions. The plurality of protrusions and the plurality of depressions are respectively distributed at intervals along a circumferential direction of the axle tube 20 or along a circumferential direction of the inner-C-forging 30. The protrusions and depressions each radially extends from an inner portion to an outer periphery of the corresponding inner-C-forging 30 or axle tube 20. When the inner-C-forging 30 is mounted to the axle tube 20, the protrusions each is capable of engaging with different depressions such that the inner-C-forging 30 has different angles relative to a stationary element, such as a linkage base, or a damper spring support, on the axle tube 20. If the protrusions engage in the depressions, the inner-C-forging 30 can not rotate relative to the axle tube 20 unless the engagements between the protrusions and the depressions are released.

Concretely, in this embodiment, the first angle adjustment structure 31 is provided on an end surface of the inner-C-forging 30 which faces to the axle tube 20 and is perpendicular to an axis of the inner-C-forging 30. The second angle adjustment structure 21 is provided on an end surface of the axle tube 20 which faces to the inner-C-forging 30 and is perpendicular to an axis of the axle tube 20. Alternatively, in some embodiments, the end surfaces may not perpendicular to its corresponding axis and may form an acute angle or an obtuse angle with its corresponding axis instead. In this embodiment, the first angle adjustment structure 31 and the second angle adjustment structure 21 each is provided with a plurality of gear teeth arranged at intervals along the circumferential direction of the corresponding end surface. That is, in this embodiment, the protrusions are the gear teeth, and the depressions are formed between adjacent gear teeth. By means of the engagement between the gear teeth and the depressions, the circumferential positions of the inner-C-forging 30 on the axle tube 20 can be determined. Alternatively, in some embodiments, the first angle adjustment structure 31 and the second angle adjustment structure 21 each may be provided with a plurality of splines arranged at intervals along the circumferential direction of the corresponding end surface.

Figure 2:
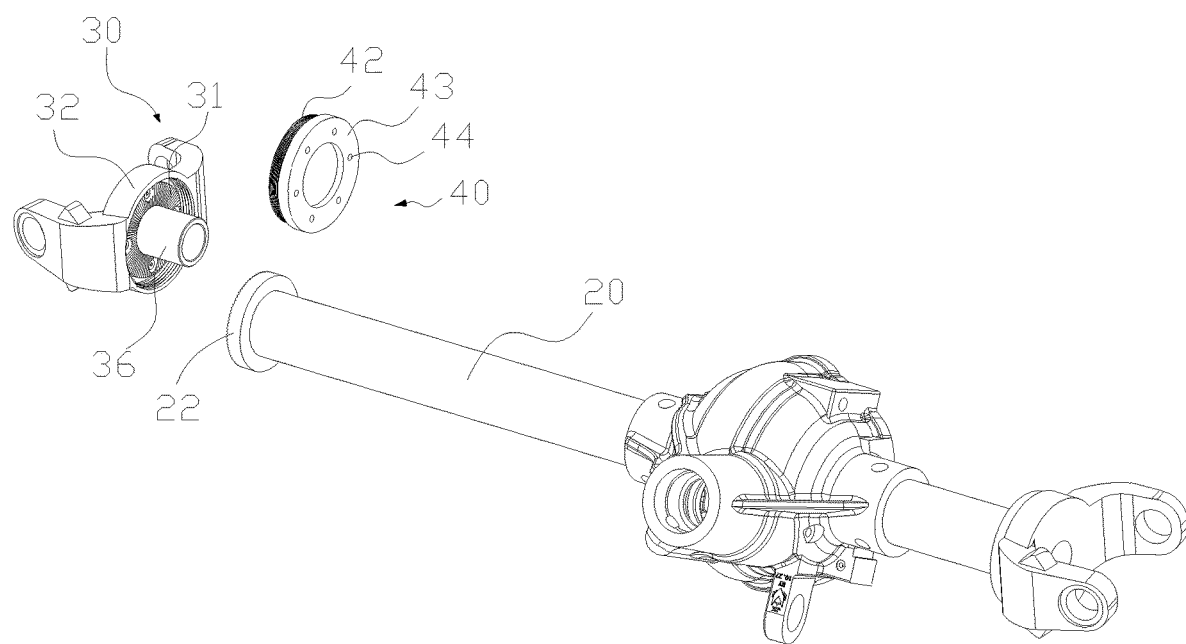
FIG. 2 is a schematic, exploded view of the adjustable front axle in FIG. 1.
Figure 3:
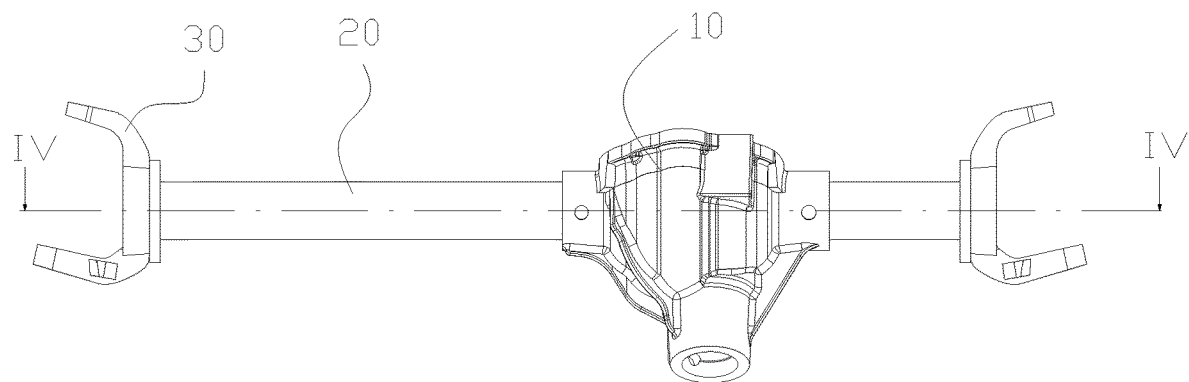
FIG. 3 is a schematic, top view of the adjustable front axle in FIG. 1.
Figure 4:
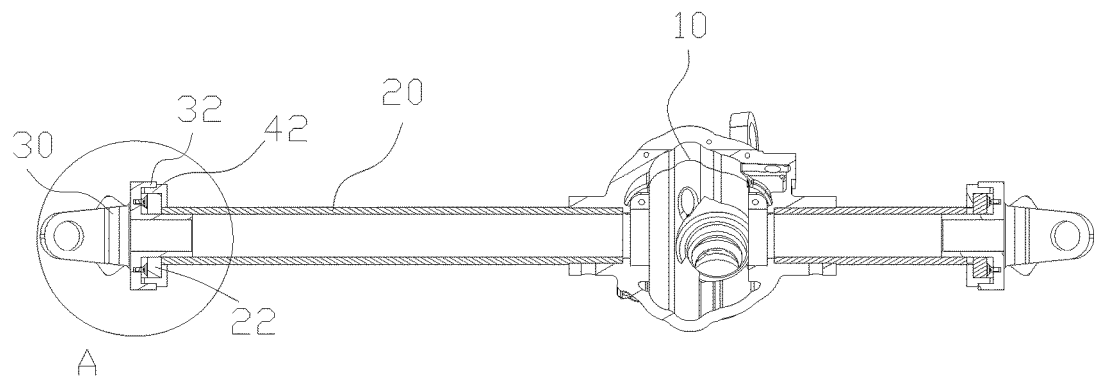
FIG. 4 is a schematic, cross-sectional view taken along line IV-IV of FIG. 3.
Figure 5:
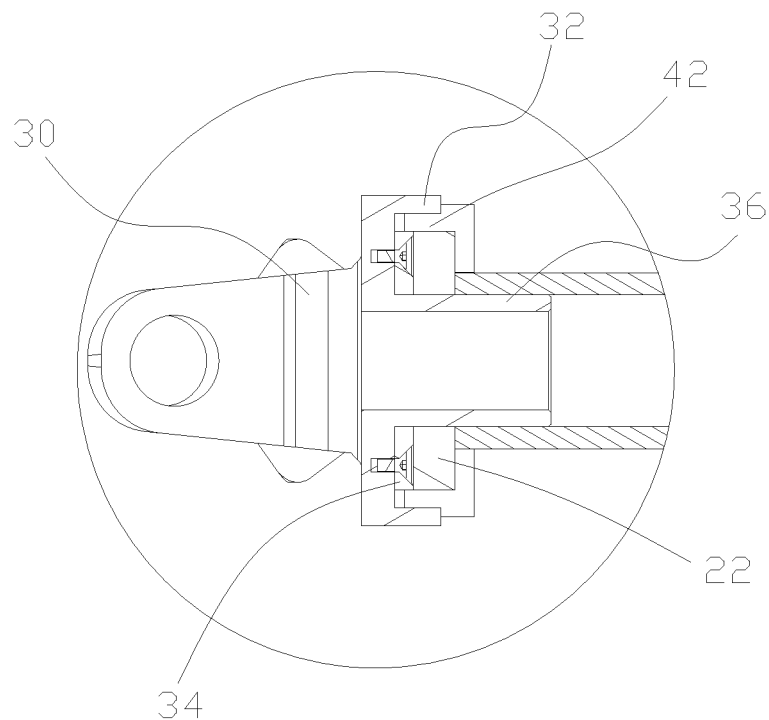
FIG. 5 is an enlarged view of circle A in FIG. 4.

Referring to FIG. 2, the axle tube 20 includes an annular flange 22 radially extending outwardly from the end of the axle tube 20 which is away from the axle housing 10. An outer diameter of the flange 22 is greater than outer diameters of other parts of the axle tube 20. The mounting apparatus 40 is loosely disposed around the axle tube 20 and located between the flange 22 and the axle housing 10 along the axial direction of the axle tube 20. The inner-C-forging 30 has a first annular ring 32 axially extending toward the axle tube 20, and the mounting apparatus 40 has a second annular ring 42 axially extending toward the inner-C-forging 30. One of the first annular ring 32 and the second annular ring 42 is provided with external threads, the other one of the first annular ring 32 and the second annular ring 42 is provided with internal threads. The mounting apparatus 40 is screwed to the inner-C-forging 30, so that the flange 22 is sandwiched between the inner-C-forging 30 and the mounting apparatus 40, which prevents the inner-C-forging 30 from fallen off from the axle tube 20. In this embodiment, the first annular ring 32 is provided with internal threads, and the second annular ring 42 is provided with external threads. When the mounting apparatus 40 is screwed to the inner-C-forging 30, the second annular ring 42 extends into the first annular ring 32. Alternatively, in some embodiments, the first annular ring 32 may be provided with external threads, and the second annular ring 42 may be provided with internal threads. When the mounting apparatus 40 is screwed to the inner-C-forging 30, the first annular ring 32 extends into the second annular ring 42.

Referring to FIG. 6 through FIG. 8, the inner-C-forging 30 includes a main body 33 and a backing plate 34. The main body 33 includes a round substrate 35. The first annular ring 32 axially extends from an outer periphery of the substrate 35, a reinforcement tube 36 axially extends from a central portion of the substrate 35, and two L-shaped arms 37 respectively extend from opposite portions of the first annular ring 32. The first annular ring 32 is provided with the threads to engage with the second annular ring 42. The reinforcement tube 36 is capable of extending into and contacting with an inner surface of the axle tube 20, for increasing a connecting strength between the inner-C-forging 30 and the axle tube 20. The arms 37 each is provided with a connecting hole for insertion of the kingpin knuckle. The backing plate 34 is disposed in the first annular ring 32 and is fixed to an inner surface of the substrate 35 by screws, pins or rivets inserted in the substrate 35 and the backing plate 34. The first angle adjustment structure 31 is formed on an end surface of the backing plate 34 which faces to the flange 22, and the second angle adjustment structure 21 is formed on an end surface of the flange 22 which faces to the backing plate 34. The arrangement that the inner-C-forging 30 is divided into two parts, i.e., the main body 33 and the backing plate 34, makes the inner-C-forging 30 could be produced easily.

Figure 9:
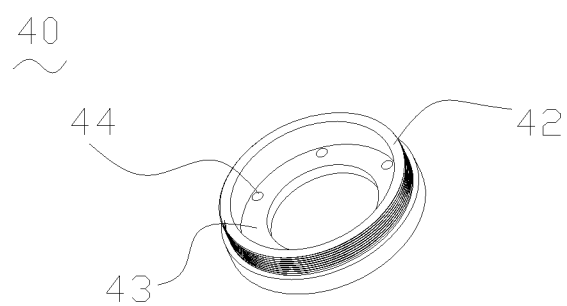
FIG. 9 is a schematic, isometric view of the mounting apparatus in FIG. 2.
Figure 10:
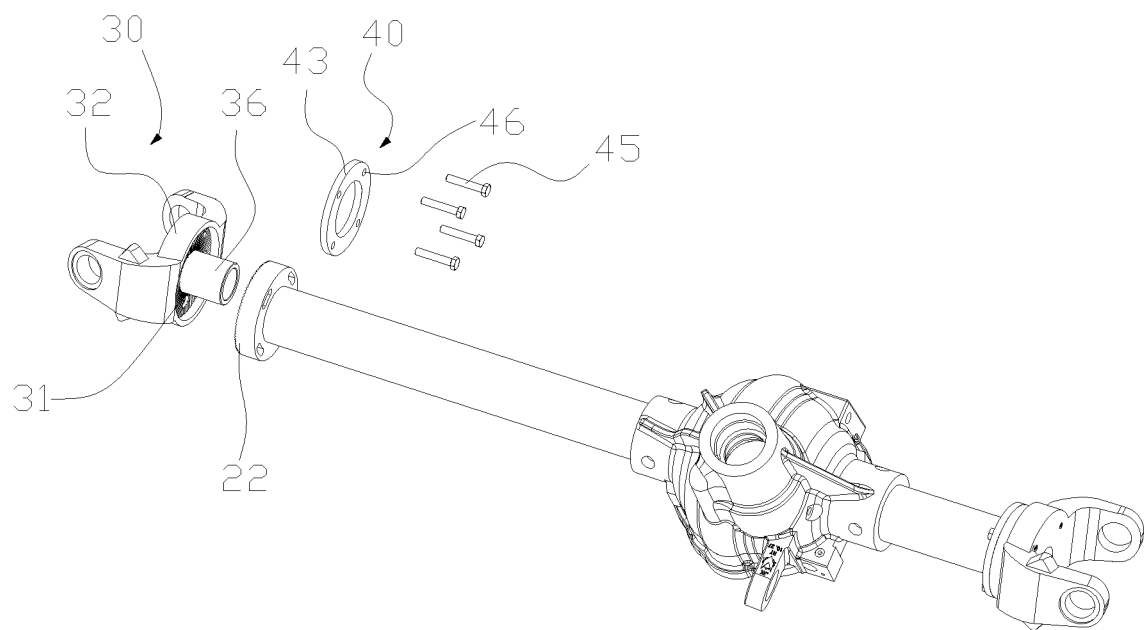
FIG. 10 is a schematic, exploded view of a second embodiment of an adjustable front axle.
Figure 11:
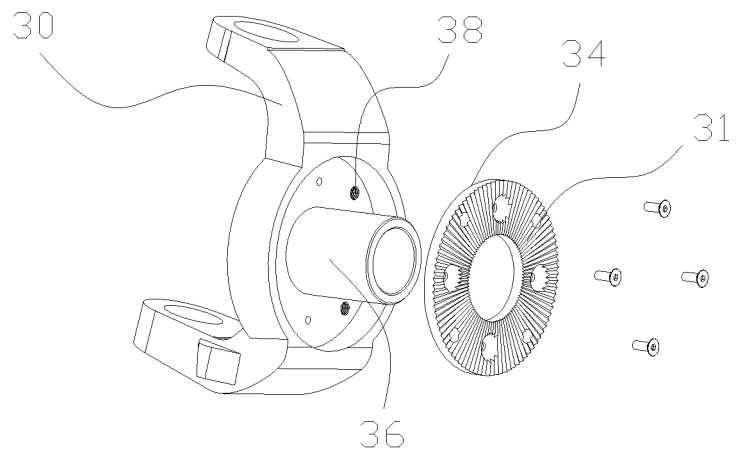
FIG. 11 is a schematic, isometric view of an inner-C-forging in FIG. 10.
Figure 12:
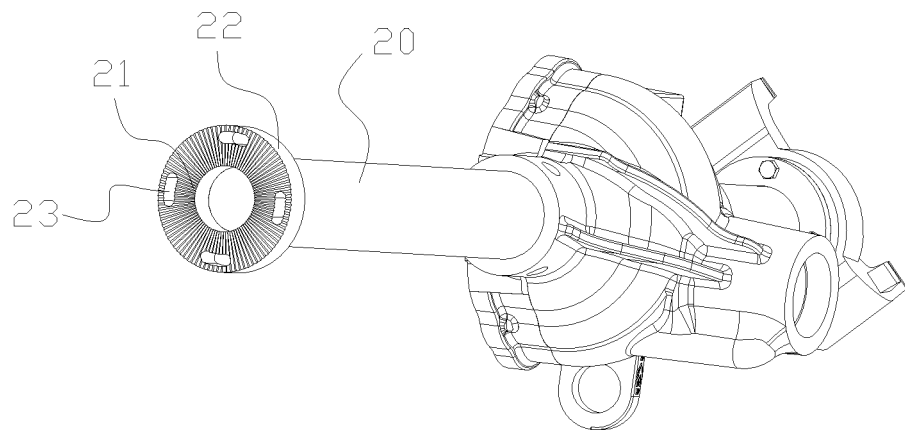
FIG. 12 is a schematic, isometric view of the adjustable front axle in FIG. 10 after removing the inner-C-forging and a mounting apparatus from one side thereof.
Figure 13:
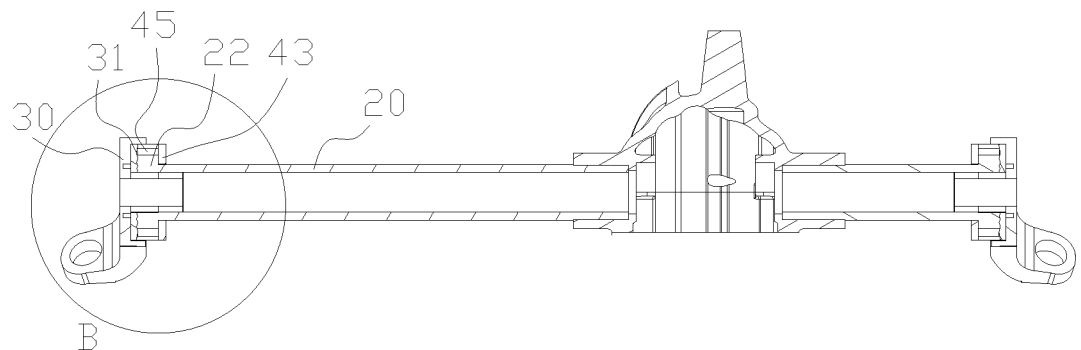
FIG. 13 is a schematic, cross-sectional view of the adjustable front axle in FIG. 10.
Figure 14:
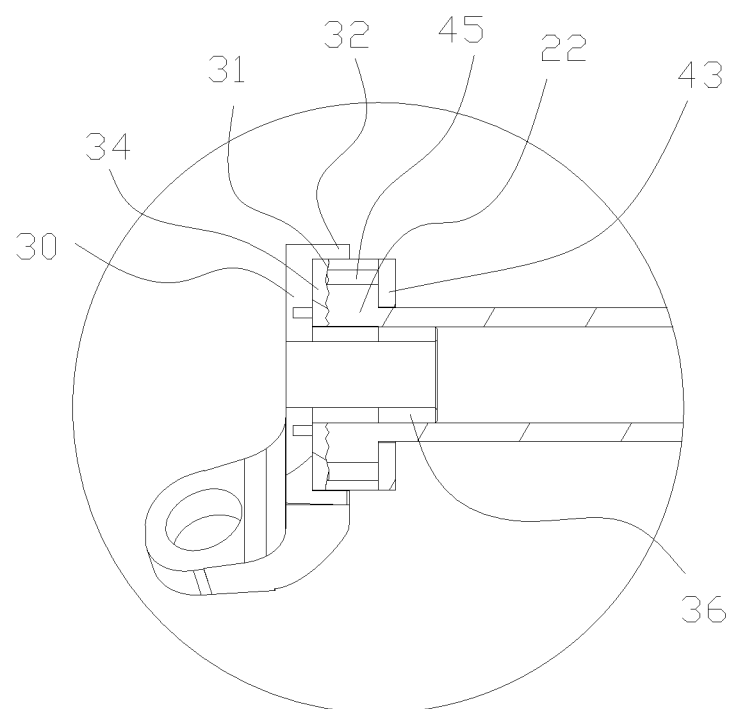
FIG. 14 is an enlarged view of circle B in FIG. 13.
Figure 15:
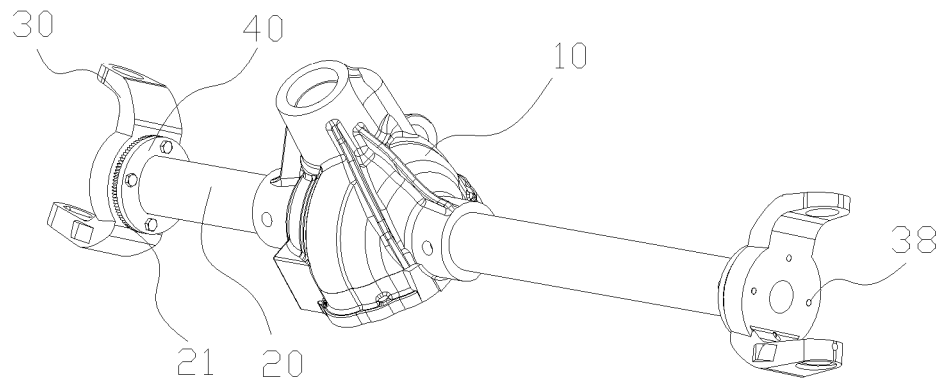
FIG. 15 is a schematic, isometric view of a third embodiment of an adjustable front axle.
Figure 16:
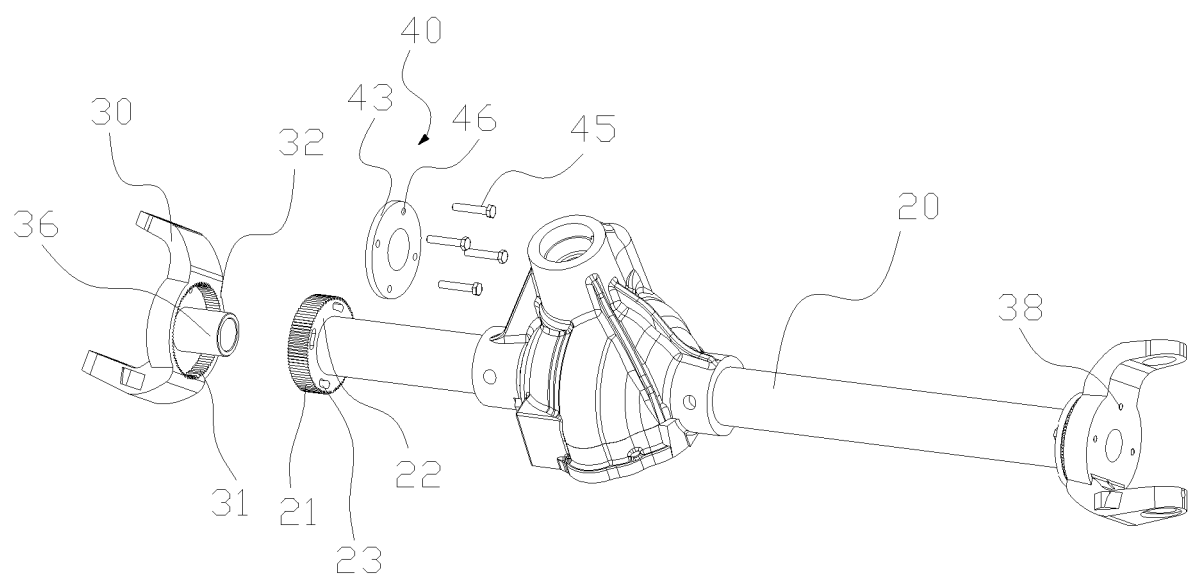
FIG. 16 is a schematic, exploded view of the adjustable front axle in FIG. 15.
Figure 17:
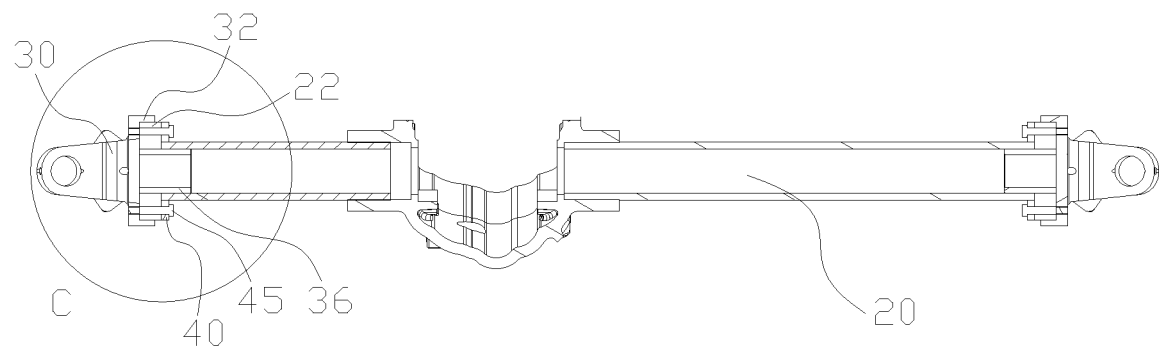
FIG. 17 is a schematic, cross-sectional view of the adjustable front axle in FIG. 15.
Figure 18:
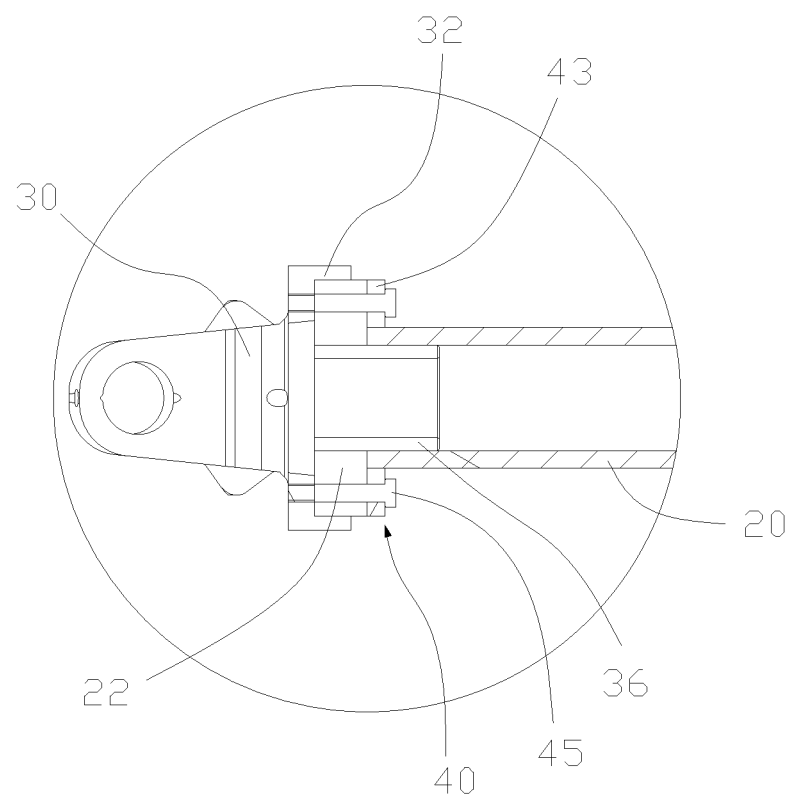
FIG. 18 is an enlarged view of circle C in FIG. 17.

Referring to FIG. 9, the mounting apparatus 40 includes an annular base 43. The second annular ring 42 axially extends from an outer periphery of the base 43. The base 43 is sleeved around the axle tube 20 and is capable of axially moving and circumferentially rotating relative to the axle tube 20. The second annular ring 42 is provided with the threads to engage with the first annular ring 32. In some embodiments, the mounting apparatus 40 has a plurality of holes 44 defined in the base 43, for insertion of a specific operation tool which helps to assemble or disassemble the mounting apparatus 40.

In this embodiment, by means of separately arranging at least one inner-C-forging 30 from a corresponding axle tube 20, and detachably mounting the inner-C-forging 30 to the axle tube 20 by the mounting apparatus 40, when it is required to adjust the caster angle, the components (simply put, the mounting apparatus 40, the inner-C-forging 30, and etc.) on one side of the vehicle can be disassembled, then the inner-C-forging 30 can be rotated around its own axis to a suitable angle, and the inner-C-forging 30 can be rejoined to the axle tube 20, with the protrusions engaging with the corresponding depressions. Finally, the second annular ring 42 is re-screwed to the first annular ring 32, so as to sandwich the flange 22 between the first annular ring 32 and the mounting apparatus 40 and complete the fixation of the inner-C-forging 30 to the axle tube 20. By means of the forgoing operations, the installation angle of the inner-C-forging 30 relative to the axle tube 20 can be adjusted, and the caster angle can be adjusted accordingly. In other words, by means of the arrangement of the first angle adjustment structure 31 and the second angle adjustment structure 21, the protrusions each may engage with different depressions, which results the inner-C-forging 30 may have different installation angles on the axle tube 20. In different installation angles, an included angle formed between an axis of a kingpin installation point and an axis of a driveshaft installation point (i.e., the caster to pinion angle) is different. By means of screwing the mounting apparatus 40 to the inner-C-forging 30 and sandwiching the flange 22 between the mounting apparatus 40 and the inner-C-forging 30, an adjustable and detachable mechanism is formed between the inner-C-forging 20 and the axle tube 20, and an assembly of the inner-C-forging 30 and the mounting apparatus 40 is prevented from falling off from the axle tube 20 by the flange 22, such that the inner-C-forging 30 could not detach from the axle tube 20 and the protrusions could keep in engagement with the depressions.

It should be noted that, the engagements between the protrusions and the depressions prevent the inner-C-forging 30 from rotating around its axis, accordingly, the mounting apparatus 40 is hardly subjected to a force along a circumferential direction of the axle tube 20. During the running of the vehicle, the mounting apparatus 40 is hardly loosen and is uneasy to come out of the first annular ring 32.

Because the inner-C-forging 30 is capable of rotating around its own axis toward a front side or a rear side of the vehicle if the protrusions disengage from the depressions, no matter the caster angle on which side of the vehicle needs to be adjusted, it can be realized by adjusting the installation angle of the corresponding inner-C-forging 30. In some embodiments, since the inner-C-forgings 30 are separately arranged from the axle tube 20, the integrity of the axle tube 20 can be ensured, and all of the installation points of the components on the axle tube 20, such as the support point of the shock absorber, and the connection point of the pull rod, and etc., can be arranged on the integral axle tube 20, which can improve the strength of the front axle. Therefore, on the premise of ensuring the support strength, the adjustable front axle can easily adjust the caster angle and the caster to kingpin angle of the vehicle independently. Meanwhile, the positions and angles of the installation points of the components are kept as original, and variables affecting the chassis wheelbase, the directional accuracy, and the suspension height cannot be introduced.

Second Embodiment

Referring to FIG. 10 through FIG. 14, a second embodiment of an adjustable front axle is provided. The second embodiment of the adjustable front axle is substantially the same as the first embodiment. The difference between the second embodiment and the first embodiment is mainly about the fixing manner of the inner-C-forging 30. In the second embodiment, the inner-C-forging 30 is fixed to the axle tube 20 by a base 43 disposed between the flange 22 and the axle housing 10, and a plurality of connecting members 45 extending through the base 43 and the flange 22 and connecting to the inner-C-forging 30.

Generally speaking, the second embodiment of the adjustable front axle includes an axle housing 10, two axle tubes 20, two inner-C-forgings 30, and at least one mounting apparatus 40. The axle tubes 20 are disposed at two opposite sides of the axle housing 10 respectively. The inner-C-forging 30 is located at an end of the axle tube 20 which is away from the axle housing 10 and is used to connect a kingpin knuckle (not shown). At least one inner-C-forging 30 is detachably fixed to a corresponding axle tube 20 by a corresponding mounting apparatus 40.

The axle tube 20 includes an annular flange 22 radially extending outwardly from the end of the axle tube 20 which is away from the axle housing 10. The inner-C-forging 30 includes a main body 33 and a backing plate 34. The main body 33 includes a round substrate 35, a reinforcement tube 36 axially extending from a central portion of the substrate 35, a first annular ring 32 axially extending from an outer periphery of the substrate 35, and two L-shaped arms 37 respectively extending from opposite portions of the first annular ring 32. The arms 37 are configured for connecting with the kingpin knuckle. The reinforcement tube 36 is capable of extending into and contacting with the axle tube 20 to increase a connecting strength between the inner-C-forging 30 and the axle tube 20. The backing plate 34 is disposed in the first annular ring 32 and is fixed to an inner surface of the substrate 35 by screws, pins or rivets. An end surface of the backing plate 34 which faces to the flange 22 is provided with a first angle adjustment structure 31, and an end surface of the flange 22 which faces to the backing plate 34 is provided with a second angle adjustment structure 21. One of the first angle adjustment structure 31 and the second angle adjustment structure 21 is provided with a plurality of protrusions, and the other one of the first angle adjustment structure 31 and the second angle adjustment structure 21 is provided with a plurality of depressions. In some embodiments, the protrusions may be the gear teeth or the splines, the depressions may be formed between adjacent protrusions. The plurality of protrusions and the plurality of depressions are respectively distributed at intervals along a circumferential direction of the end surface of the flange 22 or along a circumferential direction of the end surface of the backing plate 34, and the protrusions and depressions each radially extends from an inner portion to an outer periphery of the corresponding inner-C-forging 30 or axle tube 20. When the inner-C-forging 30 is mounted to the axle tube 20, the protrusions each is capable of engaging with different depressions such that the inner-C-forging 30 has different angles relative to a stationary element, such as a linkage base, or a damper spring support, on the axle tube 20.

The mounting apparatus 40 includes an annular base 43 and a plurality of connecting members 45. The base 43 is loosely sleeved around the axle tube 20 and is capable of axially moving and circumferentially rotating relative to the axle tube 20. The connecting members 45 may be screw bolts, pins, rivets and other suitable members, which is capable of extending through the base 43 and the flange 22 and connecting with the inner-C-forging 30, so as to fix the inner-C-forging 30 to the axle tube 20. The base 43 has a plurality of first holes 46 distributed along a circumferential direction thereof, the flange 22 has a plurality of second holes 23 distributed along a circumferential direction thereof, and the inner-C-forging 30 has a plurality of third holes 38 distributed along a circumferential direction thereof. In some embodiments, the third holes 38 may be defined both in the substrate 35 and the backing plate 34. Alternatively, in some other embodiments, the third holes 38 may be defined only in the backing plate 34. The first holes 46 and the third holes 38 are round holes, and the second holes 23 are elongated holes. Due to the second holes 23 are elongated holes, if the position of the inner-C-forging 30 on the axle tube 20 is required to be adjusted, the first holes 46 is capable of continuously aligning with the second holes 23 and the third holes 38 in a specific range, which makes the angles of the inner-C-forging 30 on the axle tube 20 have a wide regulation range.

Third Embodiment

Referring to FIG. 15 through FIG. 18, a third embodiment of an adjustable front axle is provided. The third embodiment of the adjustable front axle is substantially the same as the second embodiment. The difference between the third embodiment and the second embodiment is mainly about the position of the first angle adjustment structure 31 and the position of the second angle adjustment structure 21. In the third embodiment, the first angle adjustment structure 31 is provided on a side surface of the inner-C-forging 30 which parallels to the axial direction of the inner-C-forging 30, the second angle adjustment structure 21 is provided on a side surface of the flange 22 which parallels to the axial direction of the axle tube 20.

Generally speaking, the third embodiment of an adjustable front axle includes an axle housing 10, two axle tubes 20, two inner-C-forgings 30, and at least one mounting apparatus 40. The axle tubes 20 are disposed at two opposite sides of the axle housing 10 respectively. The inner-C-forging 30 is located at an end of the axle tube 20 which is away from the axle housing 10 and is used to connect a kingpin knuckle (not shown). At least one inner-C-forging 30 is detachably fixed to a corresponding axle tube 20 by a corresponding mounting apparatus 40.

The axle tube 20 includes an annular flange 22 radially extending outwardly from the end of the axle tube 20 which is away from the axle housing 10. The inner-C-forging 30 includes a main body 33. The main body 33 includes a round substrate 35, a reinforcement tube 36 axially extending from a central portion of the substrate 35, a first annular ring 32 axially extending from an outer periphery of the substrate 35, and two L-shaped arms 37 respectively extending from opposite portions of the first annular ring 32. The arms 37 are configured for connecting with the kingpin knuckle. The reinforcement tube 36 is capable of extending into and contacting with the axle tube 20 to increase a connecting strength between the inner-C-forging 30 and the axle tube 20. An inner side surface of the first annular ring 32 which parallels to an axial direction of the inner-C-forging 30 is provided with a first angle adjustment structure 31, and an outer side surface of the flange 22 which parallels to an axial direction of the axle tube 20 is provided with a second angle adjustment structure 21. One of the first angle adjustment structure 31 and the second angle adjustment structure 21 is provided with a plurality of protrusions, and the other one of the first angle adjustment structure 31 and the second angle adjustment structure 21 is provided with a plurality of depressions. In some embodiments, the protrusions may be the gear teeth or the splines, the depressions may be formed between adjacent protrusions. The plurality of protrusions and the plurality of depressions are respectively distributed at intervals along a circumferential direction of the side surface of the flange 22 or along a circumferential direction of the side surface of the first annular ring 32, and the protrusions or the depressions each extends along the axial direction of the inner-C-forging 30 or along the axial direction of the axle tube 20. When the inner-C-forging 30 is mounted to the axle tube 20, the protrusions each is capable of engaging with different depressions such that the inner-C-forging 30 has different angles relative to a stationary element, such as a linkage base, or a damper spring support, on the axle tube 20.

The mounting apparatus 40 includes an annular base 43 and a plurality of connecting members 45. The base 43 is loosely sleeved around the axle tube 20 and is capable of axially moving and circumferentially rotating relative to the axle tube 20. The connecting members 45 may be screw bolts, pins, rivets and other suitable members, which is capable of extending through the base 43 and the flange 22 and connecting with the inner-C-forging 30, so as to fix the inner-C-forging 30 to the axle tube 20. The base 43 has a plurality of first holes 46 distributed along a circumferential direction thereof, the flange 22 has a plurality of second holes 23 distributed along a circumferential direction thereof, and the inner-C-forging 30 has a plurality of third holes 38 distributed along a circumferential direction thereof. The first holes 46 and the third holes 38 are round holes, and the second holes 23 are elongated holes. Due to the second holes 23 are elongated holes, if the position of the inner-C-forging 30 on the axle tube 20 is required to be adjusted, the first holes 46 is capable of continuously aligning with the second holes 23 and the third holes 38 in a specific range, which makes the angles of the inner-C-forging 30 on the axle tube 20 have a wide regulation range.

Fourth Embodiment

Figure 19:
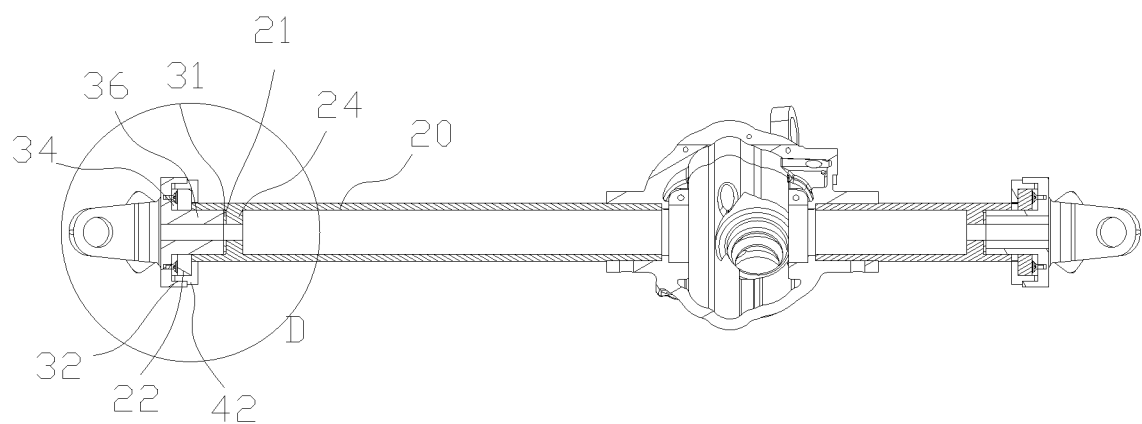
FIG. 19 is a schematic, cross-sectional view of a fourth embodiment of an adjustable front axle.
Figure 20:
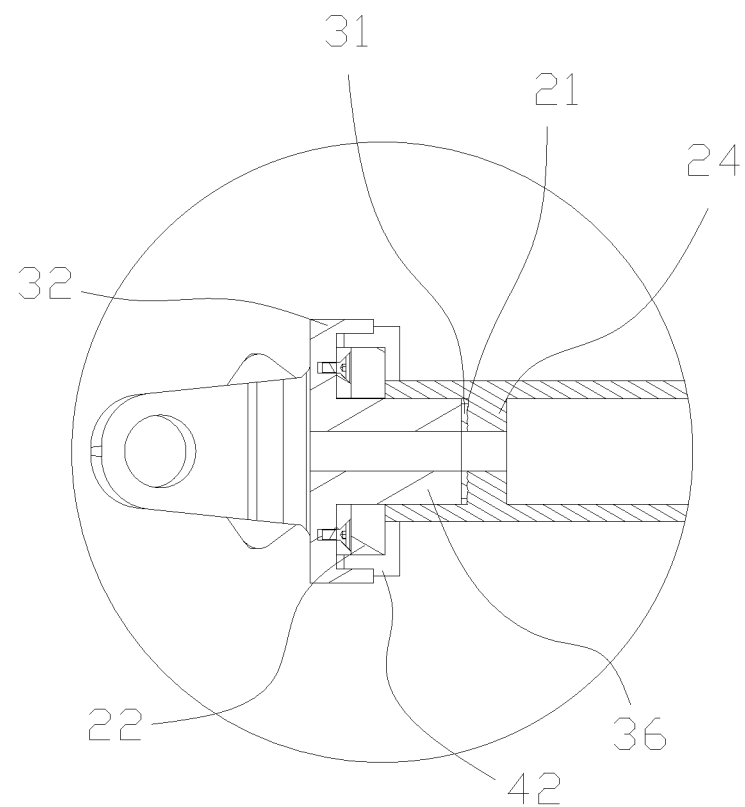
FIG. 20 is an enlarged view of circle D in FIG. 19.

Referring to FIG. 19 and FIG. 20, a fourth embodiment of an adjustable front axle is provided. The fourth embodiment of the adjustable front axle is substantially the same as the first embodiment. The difference between the fourth embodiment and the first embodiment is mainly about the position of the first angle adjustment structure 31 and the position of the second angle adjustment structure 21. In the fourth embodiment, the first angle adjustment structure 31 is provided on an end surface of the reinforcement tube 36 which faces to the axle tube 20, the second angle adjustment structure 21 is provided on an end surface of a third annular ring 24 which locates inside the axle tube 20 and faces to the inner-C-forging 30.

Generally speaking, the fourth embodiment of an adjustable front axle includes an axle housing 10, two axle tubes 20, two inner-C-forgings 30, and at least one mounting apparatus 40. The axle tubes 20 are disposed at two opposite sides of the axle housing 10 respectively. The inner-C-forging 30 is located at an end of the axle tube 20 which is away from the axle housing 10 and is used to connect a kingpin knuckle (not shown). At least one inner-C-forging 30 is detachably fixed to a corresponding axle tube 20 by a corresponding mounting apparatus 40.

The inner-C-forging 30 includes a main body 33 and a backing plate 34. The main body 33 includes a round substrate 35, a reinforcement tube 36 axially extending from a central portion of the substrate 35, a first annular ring 32 axially extending from an outer periphery of the substrate 35, and two L-shaped arms 37 respectively extending from opposite portions of the first annular ring 32. The arms 37 are configured for connecting with the kingpin knuckle. The reinforcement tube 36 is capable of extending into and contacting with the axle tube 20 to increase a connecting strength between the inner-C-forging 30 and the axle tube 20. The backing plate 34 is disposed in the first annular ring 32 and is fixed to an inner surface of the substrate 35 by screws, pins or rivets. Alternatively, in some embodiments, the inner-C-forging 30 may not include the backing plate 34.

The mounting apparatus 40 includes an annular base 43, and a second annular ring 42 axially extending from an outer periphery of the base 43. The axle tube 20 includes an annular flange 22 radially extending outwardly from the end of the axle tube 20 which is away from the axle housing 10, and a third annular ring 24 radially extending inwardly from an inner side thereof. An inner side of the third annular ring 24 forms a space for allowing a semi-axle extending therethrough.

In the fourth embodiment, an end surface of the reinforcement tube 36 which is away from the main body 33 of the inner-C-forging 30 is provided with a first angle adjustment structure 31, an end surface of the third annular ring 24 which is away from the axle housing 10 is provided with a second angle adjustment structure 21. One of the first angle adjustment structure 31 and the second angle adjustment structure 21 is provided with a plurality of protrusions, and the other one of the first angle adjustment structure 31 and the second angle adjustment structure 21 is provided with a plurality of depressions. The plurality of protrusions and the plurality of depressions are respectively distributed at intervals along a circumferential direction of the end surface of the third annular ring 24 or along a circumferential direction of the end surface of the reinforcement tube 36, and the protrusions and depressions each radially extends from an inner portion to an outer periphery of the corresponding reinforcement tube 36 or third annular ring 24. As long as the reinforcement tube 36 is inserted into the axle tube 20, the protrusions could engage with the corresponding depressions, and the installation angle of the inner-C-forging 30 on the axle tube 20 could be determined.

Furthermore, one of the first annular ring 32 and the second annular ring 42 is provided with external threads, the other one of the first annular ring 32 and the second annular ring 42 is provided with internal threads. When the mounting apparatus 40 is screwed to the inner-C-forging 30, the flange 22 is sandwiched between the inner-C-forging 30 and the mounting apparatus 40, which prevents the assembly of the mounting apparatus 40 and the inner-C-forging 30 from fallen off from the axle tube 20. If the installation angle of the inner-C-forging 30 is required to be adjusted, the mounting apparatus 40 is required to be loosened to disassemble the inner-C-forging 30 from the axle tube 20, then the reinforcement tube 36 is required to be reinserted into the axle tube 20 with required installation angle, and the mounting apparatus 40 is required to be re-screwed to the inner-C-forging 30 to fix the inner-C-forging 30 on the axle tube 20.

Fifth Embodiment

Figure 21:
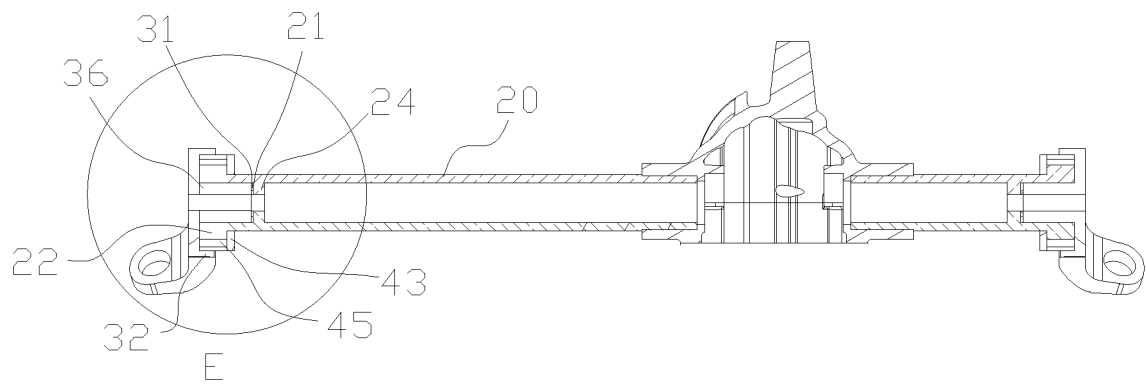
FIG. 21 is a schematic, cross-sectional view of a fifth embodiment of an adjustable front axle.
Figure 22:
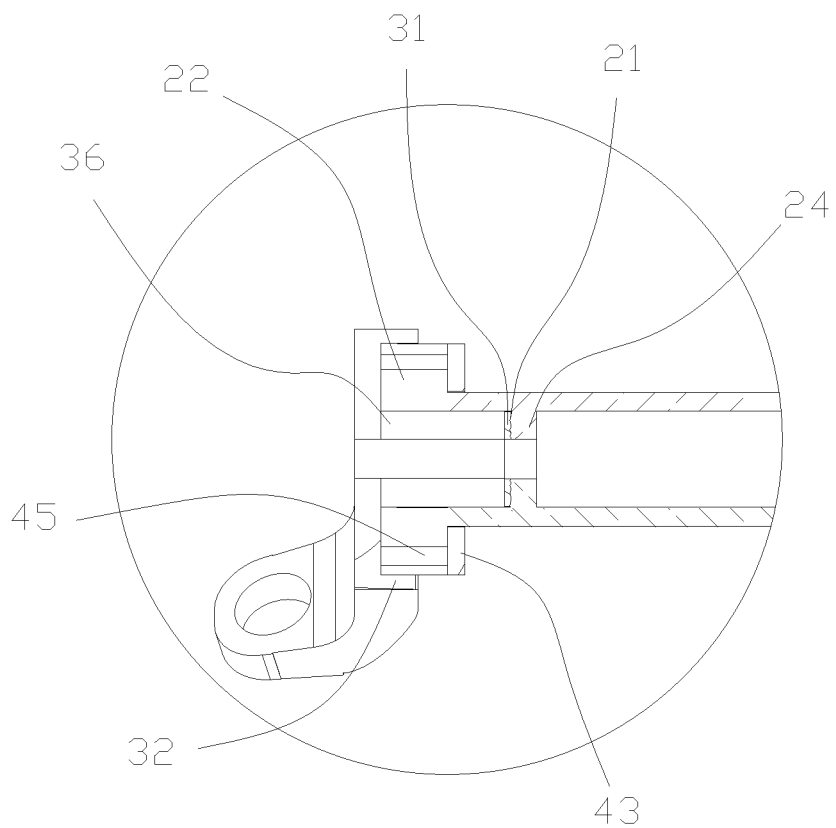
FIG. 22 is an enlarged view of circle E in FIG. 21.

Referring to FIG. 21 and FIG. 22, a fifth embodiment of an adjustable front axle is provided. The fifth embodiment of the adjustable front axle is substantially the same as the fourth embodiment. The difference between the fifth embodiment and the fourth embodiment is mainly about the fixing manner of the inner-C-forging 30. In the fifth embodiment, the inner-C-forging 30 is fixed to the axle tube 20 by a base 43 disposed between the flange 22 and the axle housing 10, and a plurality of connecting members 45 extending through the base 43 and the flange 22 and connecting to the inner-C-forging 30.

Generally speaking, the fifth embodiment of an adjustable front axle includes an axle housing 10, two axle tubes 20, two inner-C-forgings 30, and at least one mounting apparatus 40. The axle tubes 20 are disposed at two opposite sides of the axle housing 10 respectively. The inner-C-forging 30 is located at an end of the axle tube 20 which is away from the axle housing 10 and is used to connect a kingpin knuckle (not shown). At least one inner-C-forging 30 is detachably fixed to a corresponding axle tube 20 by a corresponding mounting apparatus 40.

The inner-C-forging 30 includes a main body 33. The main body 33 includes a round substrate 35, a reinforcement tube 36 axially extending from a central portion of the substrate 35, a first annular ring 32 axially extending from an outer periphery of the substrate 35, and two L-shaped arms 37 respectively extending from opposite portions of the first annular ring 32. The arms 37 are configured for connecting with the kingpin knuckle. The reinforcement tube 36 is capable of extending into and contacting with the axle tube 20 to increase a connecting strength between the inner-C-forging 30 and the axle tube 20.

The axle tube 20 includes an annular flange 22 radially extending outwardly from the end of the axle tube 20 which is away from the axle housing 10, and a third annular ring 24 radially extending inwardly from an inner side thereof. An inner side of the third annular ring 24 forms a space for allowing a semi-axle extending therethrough.

An end surface of the reinforcement tube 36 which is away from the main body 33 of the inner-C-forging 30 is provided with a first angle adjustment structure 31, an end surface of the third annular ring 24 which is away from the axle housing 10 is provided with a second angle adjustment structure 21. One of the first angle adjustment structure 31 and the second angle adjustment structure 21 is provided with a plurality of protrusions, and the other one of the first angle adjustment structure 31 and the second angle adjustment structure 21 is provided with a plurality of depressions. The plurality of protrusions and the plurality of depressions are respectively distributed at intervals along a circumferential direction of the end surface of the third annular ring 24 or along a circumferential direction of the end surface of the reinforcement tube 36, and the protrusions and depressions each radially extends from an inner portion to an outer periphery of the corresponding reinforcement tube 36 or third annular ring 24. As long as the reinforcement tube 36 is inserted into the axle tube 20, the protrusions could engage with the corresponding depressions, and the installation angle of the inner-C-forging 30 on the axle tube 20 could be determined.

The mounting apparatus 40 includes an annular base 43 and a plurality of connecting members 45. The base 43 is loosely sleeved around the axle tube 20 and is capable of axially moving and circumferentially rotating relative to the axle tube 20. The connecting members 45 may be screw bolts, pins, rivets and other suitable members, which is capable of extending through the base 43 and the flange 22 and connecting with the inner-C-forging 30, so as to fix the inner-C-forging 30 to the axle tube 20. The base 43 has a plurality of first holes 46 distributed along a circumferential direction thereof, the flange 22 has a plurality of second holes 23 distributed along a circumferential direction thereof, and the inner-C-forging 30 has a plurality of third holes 38 distributed along a circumferential direction of the substrate 35 of the inner-C-forging 30. The first holes 46 and the third holes 38 are round holes, and the second holes 23 are elongated holes. Due to the second holes 23 are elongated holes, if the position of the inner-C-forging 30 on the axle tube 20 is required to be adjusted, the first holes 46 is capable of continuously aligning with the second holes 23 and the third holes 38 in a specific range, which makes the angles of the inner-C-forging 30 on the axle tube 20 have a wide regulation range.

Sixth Embodiment

Figure 23:
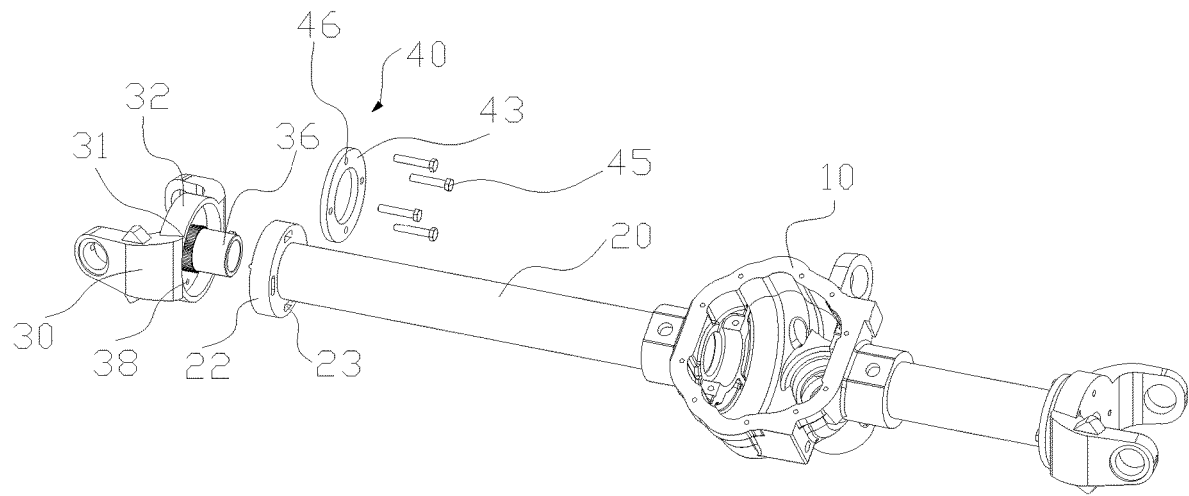
FIG. 23 is a schematic, exploded view of a sixth embodiment of an adjustable front axle.
Figure 24:
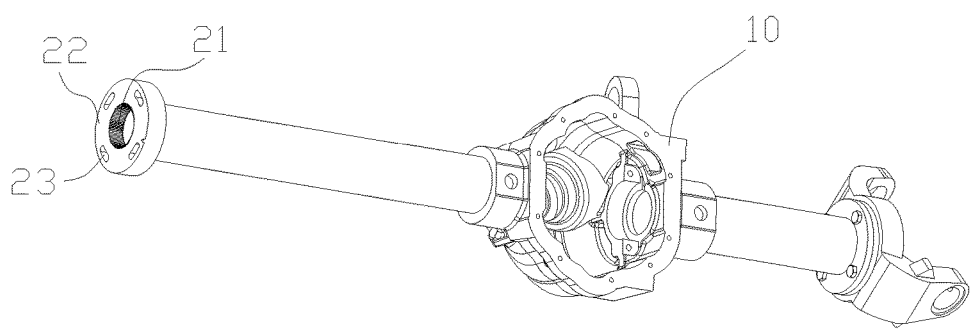
FIG. 24 is a schematic, isometric view of the adjustable front axle in FIG. 23 after removing an inner-C-forging and a mounting apparatus from one side thereof.
Figure 25:
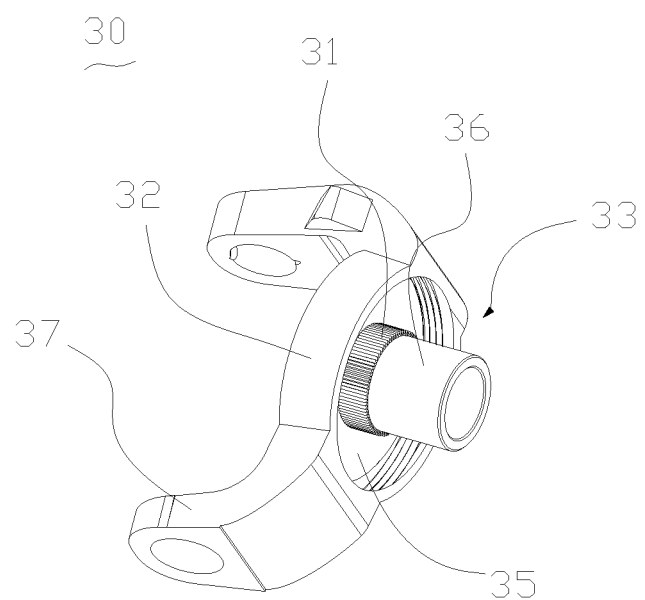
FIG. 25 is a schematic, isometric view of the inner-C-forging in FIG. 23.

Referring to FIG. 23 through FIG. 25, a sixth embodiment of an adjustable front axle is provided. The sixth embodiment of the adjustable front axle is substantially the same as the fifth embodiment. The difference between the sixth embodiment and the fifth embodiment is mainly about the position of the first angle adjustment structure 31 and the position of the second angle adjustment structure 21. In the sixth embodiment, the first angle adjustment structure 31 is provided on a side surface of the reinforcement tube 36 which parallels to the axial direction of the inner-C-forging 30, the second angle adjustment structure 21 is provided on a side surface of the flange 22 which parallels to the axial direction of the axle tube 20.

Generally speaking, the sixth embodiment of an adjustable front axle includes an axle housing 10, two axle tubes 20, two inner-C-forgings 30, and at least one mounting apparatus 40. The axle tubes 20 are disposed at two opposite sides of the axle housing 10 respectively. The inner-C-forging 30 is located at an end of the axle tube 20 which is away from the axle housing 10 and is used to connect a kingpin knuckle (not shown). At least one inner-C-forging 30 is detachably fixed to a corresponding axle tube 20 by a corresponding mounting apparatus 40.

The inner-C-forging 30 includes a main body 33. The main body 33 includes a round substrate 35, a reinforcement tube 36 axially extending from a central portion of the substrate 35, a first annular ring 32 axially extending from an outer periphery of the substrate 35, and two L-shaped arms 37 respectively extending from opposite portions of the first annular ring 32. The arms 37 are configured for connecting with the kingpin knuckle. The reinforcement tube 36 is capable of extending into and contacting with the axle tube 20 to increase a connecting strength between the inner-C-forging 30 and the axle tube 20. The axle tube 20 includes an annular flange 22 radially extending outwardly from the end of the axle tube 20 which is away from the axle housing 10. An outer side surface of the reinforcement tube 36 which parallels to an axial direction of the inner-C-forging 30 is provided with a first angle adjustment structure 31, an inner side surface of the flange 22 which parallels to an axle direction of the axle tube 20 is provided with a second angle adjustment structure 21. One of the first angle adjustment structure 31 and the second angle adjustment structure 21 is provided with a plurality of protrusions, and the other one of the first angle adjustment structure 31 and the second angle adjustment structure 21 is provided with a plurality of depressions. The plurality of protrusions and the plurality of depressions are respectively distributed at intervals along a circumferential direction of the flange 22 or along a circumferential direction of the reinforcement tube 36, and the protrusions or the depressions each extends along the axial direction of the inner-C-forging 30 or along the axial direction of the axle tube 20. As long as the reinforcement tube 36 is inserted into the axle tube 20, the protrusions could engage with the corresponding depressions, and the installation angle of the inner-C-forging 30 on the axle tube 20 could be determined.

The mounting apparatus 40 includes an annular base 43 and a plurality of connecting members 45. The base 43 is loosely sleeved around the axle tube 20 and is capable of axially moving and circumferentially rotating relative to the axle tube 20. The connecting members 45 may be screw bolts, pins, rivets and other suitable members, which is capable of extending through the base 43 and the flange 22 and connecting with the inner-C-forging 30, so as to fix the inner-C-forging 30 to the axle tube 20. The base 43 has a plurality of first holes 46 distributed along a circumferential direction thereof, the flange 22 has a plurality of second holes 23 distributed along a circumferential direction thereof, and the inner-C-forging 30 has a plurality of third holes 38 distributed along a circumferential direction of the substrate 35 of the inner-C-forging 30. The first holes 46 and the third holes 38 are round holes, and the second holes 23 are elongated holes. Due to the second holes 23 are elongated holes, if the position of the inner-C-forging 30 on the axle tube 20 is required to be adjusted, the first holes 46 is capable of continuously aligning with the second holes 23 and the third holes 38 in a specific range, which makes the angles of the inner-C-forging 30 on the axle tube 20 have a wide regulation range.

Seventh Embodiment

Figure 26:
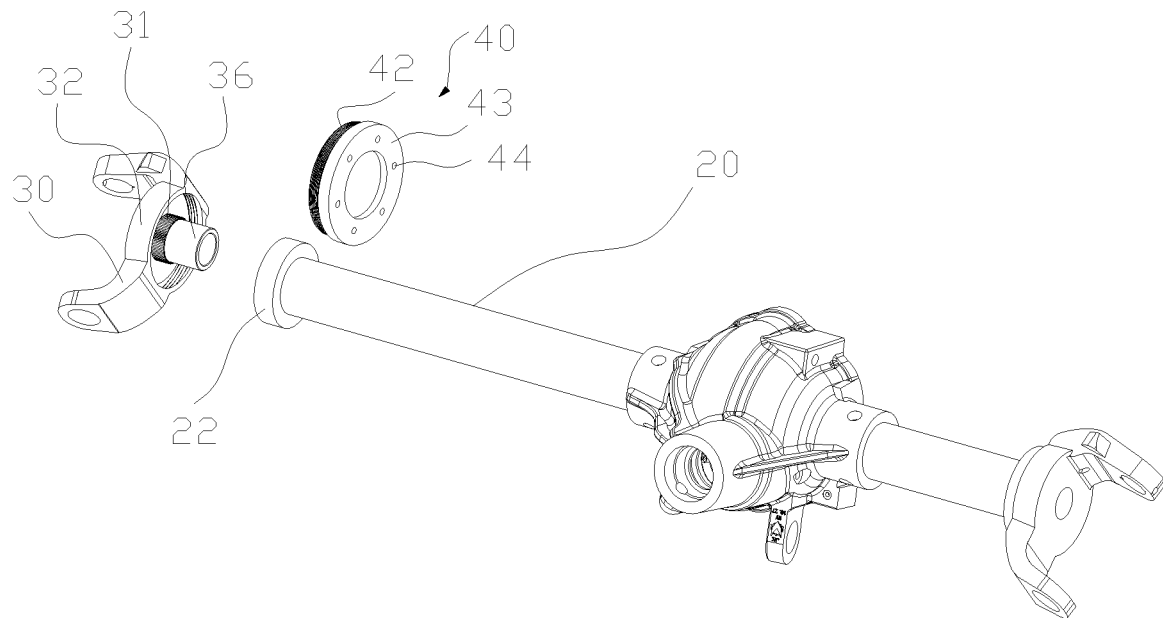
FIG. 26 is a schematic, exploded view of a seven embodiment of an adjustable front axle.
Figure 27:
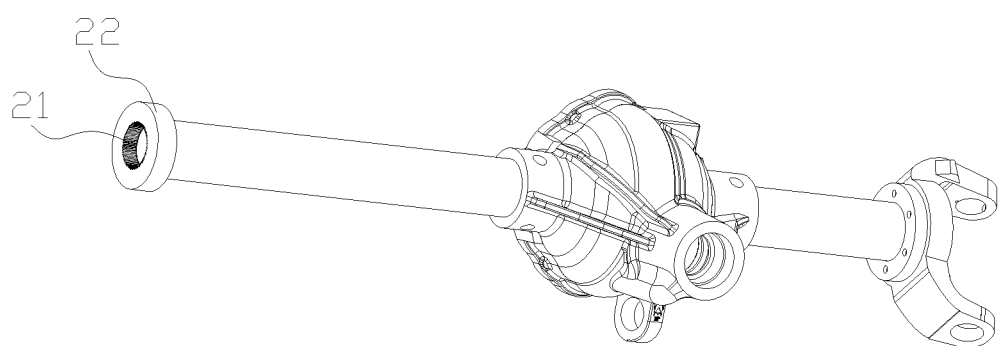
FIG. 27 is a schematic, isometric view of the adjustable front axle in FIG. 26 after removing an inner-C-forging and a mounting apparatus from one side thereof.

Referring to FIG. 26 and FIG. 27, a seventh embodiment of an adjustable front axle is provided. The seventh embodiment of the adjustable front axle is substantially the same as the sixth embodiment. The difference between the seventh embodiment and the sixth embodiment is mainly about the fixing manner of the inner-C-forging 30. In the seventh embodiment, the mounting apparatus 40 includes an annular base 43, and a second annular ring 42 axially extending from an outer periphery of the base 43. The first annular ring 32 and the second annular ring 42 are both provided with threads, to screw the mounting apparatus 40 to the inner-C-forging 30 and sandwich the flange 22 between the mounting apparatus 40 and the inner-C-forging 30, so as to prevent the inner-C-forging 30 from fallen off from the axle tube 20.

Generally speaking, the seventh embodiment of an adjustable front axle includes an axle housing 10, two axle tubes 20, two inner-C-forgings 30, and at least one mounting apparatus 40. The axle tubes 20 are disposed at two opposite sides of the axle housing 10 respectively. The inner-C-forging 30 is located at an end of the axle tube 20 which is away from the axle housing 10 and is used to connect a kingpin knuckle (not shown). At least one inner-C-forging 30 is detachably fixed to a corresponding axle tube 20 by a corresponding mounting apparatus 40.

The inner-C-forging 30 includes a main body 33. The main body 33 includes a round substrate 35, a reinforcement tube 36 axially extending from a central portion of the substrate 35, a first annular ring 32 axially extending from an outer periphery of the substrate 35, and two L-shaped arms 37 respectively extending from opposite portions of the first annular ring 32. The arms 37 are configured for connecting with the kingpin knuckle. The reinforcement tube 36 is capable of extending into and contacting with the axle tube 20 to increase a connecting strength between the inner-C-forging 30 and the axle tube 20. The axle tube 20 includes an annular flange 22 radially extending outwardly from the end of the axle tube 20 which is away from the axle housing 10. An outer side surface of the reinforcement tube 36 which parallels to an axial direction of the inner-C-forging 30 is provided with a first angle adjustment structure 31, an inner side surface of the flange 22 which parallels to an axle direction of the axle tube 20 is provided with a second angle adjustment structure 21. One of the first angle adjustment structure 31 and the second angle adjustment structure 21 is provided with a plurality of protrusions, and the other one of the first angle adjustment structure 31 and the second angle adjustment structure 21 is provided with a plurality of depressions. The plurality of protrusions and the plurality of depressions are respectively distributed at intervals along a circumferential direction of the flange 22 or along a circumferential direction of the reinforcement tube 36, and the protrusions or the depressions each extends along the axial direction of the inner-C-forging 30 or along the axial direction of the axle tube 20. As long as the reinforcement tube 36 is inserted into the axle tube 20, the protrusions could engage with the corresponding depressions, and the installation angle of the inner-C-forging 30 on the axle tube 20 could be determined.

The mounting apparatus 40 includes an annular base 43 and a second annular ring 42 axially extends from an outer periphery of the base 43. The base 43 is loosely sleeved around the axle tube 20 and is capable of axially moving and circumferentially rotating relative to the axle tube 20. The first annular ring 32 and the second annular ring 42 are provided with the threads to fix the mounting apparatus 40 to the inner-C-forging 30. The threads may be formed on an outer side surface of the second annular ring 42 and an inner side surface of the first annular ring 32. Alternatively, the threads may be formed on an inner side surface of the second annular ring 42 and an outer side surface of the first annular ring 32 as well.

According to the forgoing descriptions we can conclude that, in the present document, the inner-C-forging 30 on at least one of the axle tube 20 is separately arranged from the corresponding axle tube 20, and the inner-C-forging 30 is detachably connected to the axle tube 20 through the mounting apparatus 40. When it is required to adjust the caster angle, the components on one side of the vehicle can be disassembled, such that the inner-C-forging 30 can be rotated around its own axis to a suitable angle, and the inner-C-forging 30 can be rejoined to the axle tube 20 with the protrusions engaging with the corresponding depressions. Finally, the mounting apparatus 40 is fixed to the inner-C-forging 30 to sandwich the flange 22 between the inner-C-forging 30 and the mounting apparatus 40 and complete the assembly of the inner-C-forging 30 to the axle tube 20. This can change the installation angle of the inner-C-forging 30 relative to the axle tube 20, and change the angle of the installation point so as to further adjust the caster angle. In other words, through the arrangement of the first angle adjustment structure 31 and the second angle adjustment structure 21, the inner-C-forging 30 may have different installation angles relative to the axle tube 20. By means of sandwiching the flange 22 between the mounting apparatus 40 and the inner-C-forging 30, the inner-C-forging 30 is fixed to and could not disengage from the axle tube 20. Under the premise of ensuring the support strength, the adjustable front axle can easily adjust the caster angle and the caster to kingpin angle on both sides of the vehicle independently. Meanwhile, the positions and angles of the installation points of the components on the axle tube 20 are still kept as original, and variables that affect the chassis wheelbase, the directional accuracy, and the suspension height can not be introduced.

Some embodiments may include a vehicle, which includes a wheel, a kingpin knuckle for connecting with the wheel, and an adjustable front axle disposed under a chassis of the vehicle for connecting with the kingpin knuckle. The adjustable front axle may be anyone of the above-mentioned embodiments of the adjustable front axle. Other technical features of the vehicle are common knowledge in the field, and will not be repeated here.

The above descriptions are only preferred embodiments, and it should be pointed out that for those of ordinary skill in the art, without departing from the principle of the present document, some improvements and modifications can also be made, and these improvements and modifications are also considered to be included in the protection scope of the present document.

What is claimed is:

1. An adjustable front axle, comprising:
   an axle housing;
   an axle tube connected to an end of the axle housing;
   an inner-C-forging disposed on the axle tube at an end away from the axle housing; and
   a mounting apparatus comprising a base which is disposed on the axle tube, and a plurality of connecting members which are capable of coupling the inner-C-forging to the base to mount the inner-C-forging to the axle tube;
   the inner-C-forging being provided with a first angle adjustment structure, the axle tube being provided with a second angle adjustment structure, the first angle adjustment structure and the second angle adjustment structure having different cooperation positions such that the inner-C-forging having different installation angles relative to the axle tube;
   the axle tube comprising a flange at an end away from the axle housing, the base being disposed between the flange and the axle housing, wherein when the inner-C-forging is coupled to the base, the flange is sandwiched between the base and the inner-C-forging.

2. The adjustable front axle according to claim 1, wherein the base has a plurality of first holes distributed along a circumferential direction thereof, the flange has a plurality of second holes distributed along a circumferential direction thereof, the inner-C-forging has a plurality of third holes distributed along a circumferential direction thereof, the first holes and the third holes are round holes, the second holes are elongated holes, the connecting members extend through the first holes, the second holes and the third holes in sequence.

3. The adjustable front axle according to claim 2, wherein the connecting members are selected from a group consisting of screws, pins and rivets.

4. The adjustable front axle according to claim 1, wherein the first angle adjustment structure is provided on an end surface of the inner-C-forging which faces to the axle tube, the second angle adjustment structure is provided on an end surface of the axle tube which faces to the inner-C-forging.

5. The adjustable front axle according to claim 4, wherein the inner-C-forging comprises a backing plate perpendicular to an axis of the inner-C-forging, the first angle adjustment structure is formed on an end surface of the backing plate which faces to the flange.

6. The adjustable front axle according to claim 5, wherein the backing plate is fixed to an inner side of the inner-C-forging by screws, pins or rivets.

7. The adjustable front axle according to claim 4, wherein the inner-C-forging comprises a reinforcement tube which is capable of extending into the axle tube, the axle tube comprises a third annular ring inside the axle tube, the first angle adjustment structure is formed on an end surface of the reinforcement tube which faces to the third annular ring, the second angle adjustment structure is provided on an end surface of the third annular ring which faces to the reinforcement tube.

8. The adjustable front axle according to claim 1, wherein the first angle adjustment structure is provided on a side surface of the inner-C-forging which is parallel to an axis of the inner-C-forging, the second angle adjustment structure is provided on a side surface of the axle tube which is parallel to an axis of the axle tube.

9. The adjustable front axle according to claim 8, wherein the inner-C-forging comprises a first annular ring which is capable of receiving the flange, the first angle adjustment structure is provided on an inner side surface of the first annular ring, the second angle adjustment structure is provided on an outer side surface of the flange.

10. The adjustable front axle according to claim 8, wherein the inner-C-forging comprises a reinforcement tube which is capable of extending into the axle tube, the first angle adjustment structure is provided on an outer side surface of the reinforcement tube, the second angle adjustment structure is provided on an inner side surface of the axle tube.

11. The adjustable front axle according to claim 1, wherein one of the first angle adjustment structure and the second angle adjustment structure is provided with a plurality of protrusions, the other one of the first angle adjustment structure and the second angle adjustment structure is provided with a plurality of depressions, the protrusions or the depressions are disposed along a circumferential direction of a corresponding axle tube or a circumferential direction of the inner-C-forging, the second angle adjustment structure has different cooperation positions on the first angle adjustment structure by means of the cooperation of the protrusions and different depressions.

12. A vehicle, comprising:
an adjustable front axle, comprising:
an axle housing;
an axle tube connected to an end of the axle housing;
an inner-C-forging disposed on the axle tube at an end away from the axle housing and configured for connecting with a kingpin knuckle;
a mounting apparatus comprising a base which is disposed on the axle tube, and a plurality of connecting members which are capable of coupling the inner-C-forging to the base to fix the inner-C-forging to the axle tube;

the inner-C-forging being provided with a first angle adjustment structure, the axle tube being provided with a second angle adjustment structure, one of the first angle adjustment structure and the second angle adjustment structure being provided with a plurality of protrusions, the other one of the first angle adjustment structure and the second angle adjustment structure being provided with a plurality of depressions, the protrusions each being capable of engaging with different depressions such that the inner-C-forging being capable of having different installation angles relative to the axle tube;
the axle tube comprising a flange at an end away from the axle housing, the base being disposed between the flange and the axle housing, wherein when the inner-C-forging is coupled to the base, the flange is sandwiched between the base and the inner-C-forging.

13. The vehicle according to claim 12, wherein the base comprises a plurality of elongated holes, the connecting members are capable of extending through the flange and the elongated holes, and being coupled to the inner-C-forging.

14. The vehicle according to claim 12, wherein the first angle adjustment structure is provided on an end surface of the inner-C-forging which faces to the axle tube, the second angle adjustment structure is provided on an end surface of the axle tube which faces to the inner-C-forging.

15. The vehicle according to claim 14, wherein the inner-C-forging comprises a backing plate which is mounted to a main body of the inner-C-forging, the first angle adjustment structure is formed on an end surface of the backing plate which faces to the flange.

16. The vehicle according to claim 14, wherein the inner-C-forging comprises a reinforcement tube which is capable of extending into the axle tube, the axle tube comprises a third annular ring inside the axle tube, the first angle adjustment structure is formed on an end surface of the reinforcement tube which faces to the third annular ring, the second angle adjustment structure is provided on an end surface of the third annular ring which faces to the reinforcement tube.

17. The vehicle according to claim 12, wherein the first angle adjustment structure is provided on a side surface of the inner-C-forging which is parallel to an axis of the inner-C-forging, the second angle adjustment structure is provided on a side surface of the axle tube which is parallel to an axis of the axle tube.

18. The vehicle according to claim 17, wherein the inner-C-forging comprises a first annular ring which is capable of receiving the flange, the first angle adjustment structure is provided on an inner side surface of the first annular ring, the second angle adjustment structure is provided on an outer side surface of the flange.

19. The vehicle according to claim 17, wherein the inner-C-forging comprises a reinforcement tube which is capable of extending into the axle tube, the first angle adjustment structure is provided on an outer side surface of the reinforcement tube, the second angle adjustment structure is provided on an inner side surface of the axle tube.

* * * * *